United States Patent
Berbner et al.

[11] Patent Number: 5,916,999
[45] Date of Patent: Jun. 29, 1999

[54] PROCESS FOR PRODUCING FILAMENTS FROM MELAMINE/FORMALDEHYDE CONDENSATION PRODUCTS

[75] Inventors: Heinz Berbner, Mörlenbach; Hartmut Gihr; Uwe Rachwalsky, both of Ludwigshafen; Hans Dieter Zettler, Grünstadt, all of Germany

[73] Assignee: BASF Aktiengesellschaft, Ludwigshafen, Germany

[21] Appl. No.: 08/930,172

[22] PCT Filed: Apr. 22, 1996

[86] PCT No.: PCT/EP96/01677

§ 371 Date: Oct. 9, 1997

§ 102(e) Date: Oct. 9, 1997

[51] Int. Cl.[6] .................................................. C08G 12/30
[52] U.S. Cl. .................. 528/254; 528/499; 528/502 A; 528/503; 528/163; 264/176.1; 521/65; 521/187
[58] Field of Search .......................... 528/254, 499, 528/502 A, 503, 163; 264/176.1; 521/65, 187

[56] References Cited

U.S. PATENT DOCUMENTS

| | | |
|---|---|---|
| 4,088,620 | 5/1978 | Nihongi et al. . |
| 4,497,934 | 2/1985 | Streetman . |
| 4,996,289 | 2/1991 | Berbner et al. . |
| 5,084,488 | 1/1992 | Weiser et al. . |
| 5,162,487 | 11/1992 | Weiser et al. . |
| 5,322,915 | 6/1994 | Weiser et al. . |

FOREIGN PATENT DOCUMENTS

| | | |
|---|---|---|
| 93 965 | 11/1983 | European Pat. Off. . |
| 221 330 | 5/1987 | European Pat. Off. . |
| 355 760 | 2/1990 | European Pat. Off. . |
| 408 947 | 1/1991 | European Pat. Off. . |
| 523 485 | 1/1993 | European Pat. Off. . |
| 23 64 091 | 7/1976 | Germany . |
| 1 452 629 | 10/1976 | United Kingdom . |

*Primary Examiner*—Duc Truong
*Attorney, Agent, or Firm*—Keil & Weinkauf

[57] ABSTRACT

A process for producing continuous filament fibers from a hydroxy- or amino-alkyl-melamine modified melamine-formaldehyde condensation product comprises filtering the highly concentrated aqueous solution of the melamine-formaldehyde condensation product, forcing the filtrate through a spinneret, drying the extruded filaments in a drying shaft by means of hot air, and treating the dried filaments in a tempering oven at temperatures which rise gradually to a maximum temperature of from 160 to 250° C. to cure the precondensate.

4 Claims, 1 Drawing Sheet

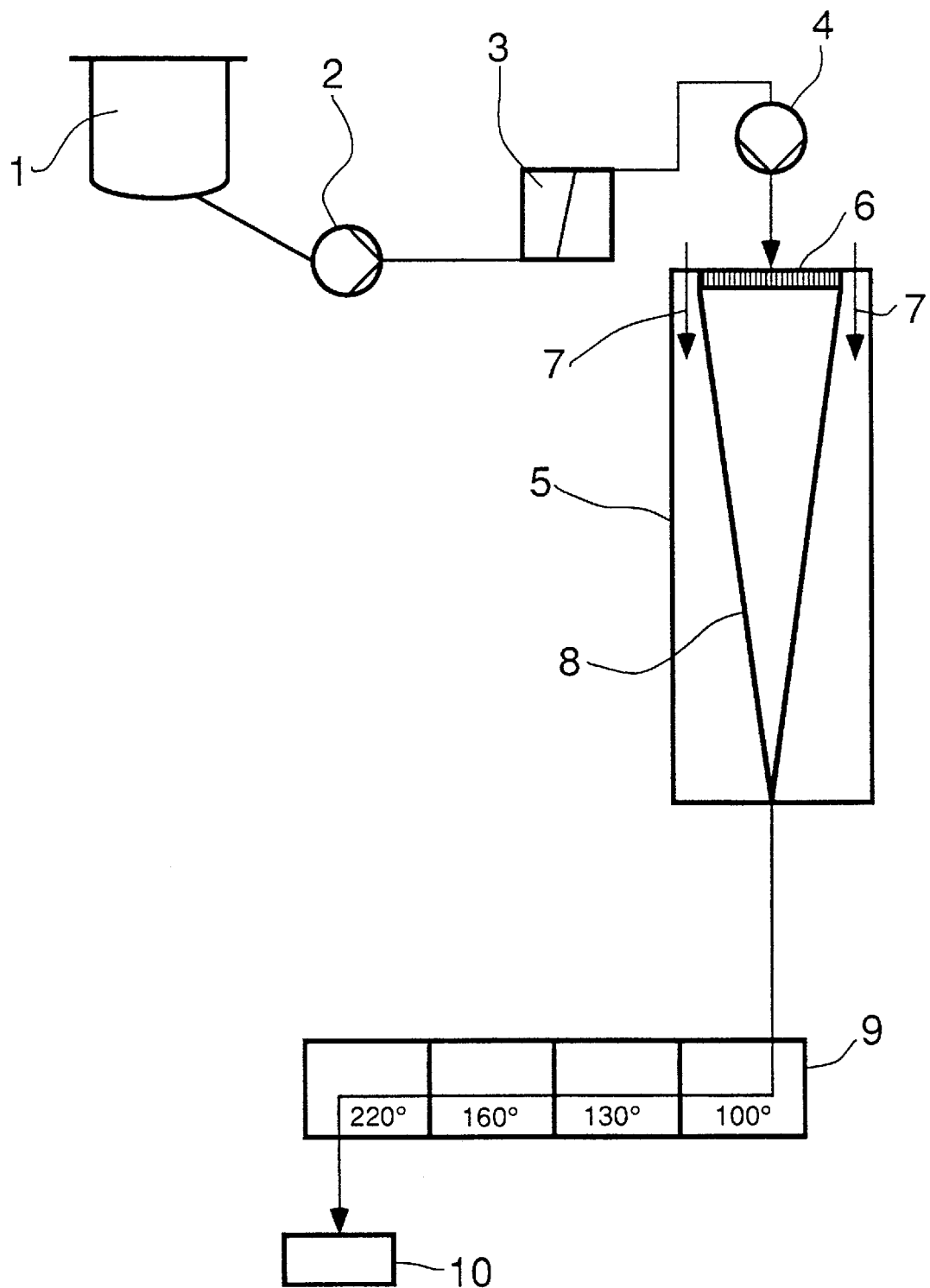

PROCESS FOR PRODUCING FILAMENTS FROM MELAMINE/FORMALDEHYDE CONDENSATION PRODUCTS

The present invention relates to a process for producing continuous filament fibers from melamine-formaldehyde (MF) condensation products by spinning a highly concentrated aqueous solution of the MF precondensate, evaporating the water and curing the precondensate.

The production of fibers from MF condensation products was first described in DE-B-23 64 091. In this process, the aqueous solution of the precondensate is spun into a heated atmosphere in which, at one and the same time, the water evaporates and the precondensate cures. Since the curing process takes a comparatively long time, long piping is required downstream of the spinneret if nontacky fibers are to be obtained. In addition, this process gives adequate spinning speeds only if the MF condensate is admixed with fiber-forming polymers, for example polyvinyl alcohol. However, such polymers impair the flame resistance of the fibers and of textile materials produced therefrom.

EP-A-93 965 therefore proposes admixing MF precondensates (which may optionally contain N-alkyl-substituted melamines as cocondensed units) with from 1 to 20% by weight of alkali metal salts, preferably sodium metabisulfite, spinning the solution into a heated atmosphere, evaporating the water and curing the precondensate at elevated temperature. The fibers obtained, however, have in consequence of their alkali metal salt content little hydrolysis resistance.

EP-A-221 330, 408 947 and 523 485 describe hydroxyalkylmelamine-modified MF condensates which can likewise be spun into fibers. Suitable spinning processes are said to be on the one hand the "dry reaction spinning process" of DE-A-23 64 091 and, on the other, a centrifugal spinning process. However, the latter does not afford continous filament fibers, but only comparatively short fibers of nonuniform length.

It is an object of the present invention to provide a technically simple process for producing thin continuous filament fibers from MF condensation products which affords incombustible and infusible fibers of high strength and good hydrolysis resistance at high spinning speed.

We have found that this object is achieved by the process of claim 1.

The process of the present invention starts from an MF precondensate. This MF precondensate comprises as a monomeric building block from 90 to 99.9 mol % of a mixture consisting essentially of (a) from 30 to 99, preferably from 50 to 99, particularly preferably from 85 to 95, mol % of melamine and (b) from 1 to 70, preferably from 1 to 50, particularly preferably from 5 to 15, mol % of a substituted melamine I, or mixtures of substituted melamines I.

A preferred MF precondensate comprises as further monomeric building block (c) from 0.1 to 10 mol %, based on the total number of moles of monomeric building blocks (a)+(b)+(c), of a phenol or of a mixture of phenols.

The condensation products of the present invention are obtainable by reacting components (a), (b) and optionally (c) with formaldehyde or formaldehyde-supplying compounds in a molar ratio of melamines+phenols to formaldehyde within the range from 1:1.15 to 1:4.5, preferably from 1:1.8 to 1:3.0.

Candidate substituted melamines (b) of the general formula I

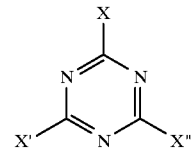

I are those in which X, X' and X" are each selected from the group consisting of —$NH_2$, —NHR and NRR', provided X, X' and X" are not all —$NH_2$, and R and R' are each selected from the group consisting of hydroxy—$C_2$—$C_{10}$—alkyl, hydroxy—$C_2$—$C_4$—alkyl(oxa—$C_2$—$C_4$—alkyl)$_n$, where n is from 1 to 5, and amino—$C_2$—$C_{12}$—alkyl.

Preferred hydroxy—$C_2$—$C_{10}$—alkyl includes hydroxy—$C_2$—$C_6$—alkyl such as 2-hydroxyethyl, 3-hydroxy-n-propyl, 2-hydroxyisopropyl, 4-hydroxy-n-butyl, 5-hydroxy-n-pentyl, 6-hydroxy-n-hexyl, 3-hydroxy-2,2-dimethylpropyl, preferably hydroxy—$C_2$—$C_4$—alkyl such as 2-hydroxyethyl, 3-hydroxy-n-propyl, 2-hydroxyisopropyl and 4-hydroxy-n-butyl, particularly preferably 2-hydroxyethyl and 2-hydroxyisopropyl.

Preferred hydroxy—$C_2$—$C_4$—alkyl(oxa—$C_2$—$C_4$—alkyl)$_n$ groups are those with n from 1 to 4, preferably those with n=1 or 2, such as 5-hydroxy-3-oxapentyl, 5-hydroxy-3-oxa-2,5-dimethylpentyl, 5-hydroxy-3-oxa-1,4-dimethylpentyl, 5-hydroxy-3-oxa-1,2,4,5-tetramethylpentyl, 8-hydroxy-3,6-dioxaoctyl.

Amino—$C_2$—$C_{12}$—alkyl is preferably amino—$C_2$—$C_8$—alkyl such as 2-aminoethyl, 3-aminopropyl, 4-aminobutyl, 5-aminopentyl, 6-aminohexyl, 7-aminoheptyl and also 8-aminooctyl, particularly preferably 2-aminoethyl and 6-aminohexyl, very particularly preferably 6-aminohexyl.

Substituted melamines particularly suitable for the purposes of the present invention are the following compounds: 2-hydroxyethylaminomelamine such as 2-hydroxyethylaminomelamine, 2,4-di(2-hydroxyethylamino)melamine, 2,4,6-Tris(2-hydroxyethylamino)melamine, 2-hydroxyisopropylaminomelamine such as 2-(2-hydroxyisopropylamino)melamine, 2,4-di(2-hydroxyisopropylamino)melamine, 2,4,6-Tris(2-hydroxyisopropylamino)melamine, 5-hydroxy-3-oxapentylaminomelamine such as 2-(5-hydroxy-3-oxapentylamino)melamine, 2,4-di(5-hydroxy-3-oxapentylamino)melamine, 2,4,6-Tris(5-hydroxy-3-oxapentylamino)melamine and also 6-aminohexylaminomelamine such as 2-(6-aminohexylaminopentylamino)melamine, 2,4-di(6-aminohexylamino)melamine, 2,4,6-Tris(6-aminohexylamino)melamine or mixtures thereof, for example a mixture of 10 mol-% of 2-(5-hydroxy-3-oxapentylamino)melamine, 50 mol-% 2,4-di(5-hydroxy-3-oxapentylamino)melamine and 40 mol-% of 2,4,6-Tris(5-hydroxy-3-oxapentylamino)melamine.

Suitable phenols (c) include phenols with one or two hydroxyl groups, such as unsubstituted phenols, phenols substituted by radicals selected from the group consisting of $C_1$—$C_9$—alkyl and hydroxyl, and also $C_1$—$C_4$—alkanes substituted by two or three phenol groups, di(hydroxyphenyl) sulfones, and mixtures thereof.

Preferred phenols include phenol, 4-methylphenol, 4-tert-butylphenol, 4-n-octylphenol, 4-n-nonylphenol, pyrocatechol, resorcinol, hydroquinone, 2,2-bis(4-hydroxyphenyl)propane, 4,4'-dihydroxydiphenyl sulfone, particularly preferably phenol, resorcinol and 2,2-bis(4-hydroxyphenyl)propane.

Formaldehyde is typically used in the form of an aqueous solution having a concentration of, for example, from 40 to 50% by weight or in the form of compounds that supply formaldehyde in the course of the reaction with (a) and (b), for example as oligomeric or polymeric formaldehyde in solid form, such as paraformaldehyde, 1,3,5-trioxane or 1,3,5,7-tetroxocane.

A preferred MF precondensate is produced using from 1 to 50, preferably 5 to 15, in particular from 7 to 12, mol % of the substituted melamine and also from 0.1 to 9.5, preferably from 1 to 5, mol % of one of the above-recited phenols or mixtures thereof.

The precondensate is produced by polycondensing melamine, substituted melamine and phenol together with formaldehyde or a formaldehyde-supplying compound, either by having all components present from the start or adding them portionwise and gradually to the reaction and subsequently adding further melamine, substituted melamine or phenol to the precondensates formed.

The polycondensation is typically carried out in a conventional manner (see EP-A-355 760, Houben Weyl, Vol. 14/2, p. 357 ff).

The reaction temperatures used are generally within the range from 20 to 150° C., preferably from 40 to 140° C.

The reaction pressure is typically uncritical. In general, the pressure employed is within the range from 100 to 500 kPa, preferably from 100 to 300 kPa.

The reaction can be carried out with or without solvent. Typically, no solvent is added when aqueous formaldehyde solution is used. If formaldehyde bound in solid form is used, water is used as solvent, and the amount used is typically within the range from 5 to 40, preferably from 15 to 25, % by weight based on the total amount of monomer used.

Furthermore, the polycondensation is generally carried out within a pH range above 7. Preference is given to the pH range from 7.5 to 10.0, particularly preferably from 8 to 10.

Moreover, the reaction mixture may contain small amounts of customary additives, for example amines and also aminoalcohols such as diethylamine, ethanolamine, diethanolamine or 2-diethylaminoethanol.

Suitable further additives include fillers, for example metal powders, metal salts or silicates, for example kaolin, talc, baryte, quartz or chalk, and also pigments and dyes.

The polycondensation can be carried out batchwise or continuously, for example in a stirred tank or in an extruder (see EP-A-355 760).

In an advantageous embodiment, first a precondensate solution is prepared in a continuous extruder or kneader and then passed into a heatable stirred tank where it is devolatilized at low viscosity and then further condensed to viscosities of 2000–50,000 Pas, preferably 3000–10,000 Pas. However, it is also possible to carry out all the steps of mixing, condensing and devolatilizing in an extruder. It is further possible to prepare the solution completely in a batchwise stirred tank.

The process of the present invention is then carried out in the following successive steps:

A. First the aqueous solution of the precondensate with a water content of from 5 to 40, preferably from 10 to 25, % by weight is filtered, removing coarse particles and impurities. This can be done using a depth filter, for example.

B. The aqueous solution is then forced by means of a pump through a spinneret. This spinneret has from 500 to 5000 holes which each have a diameter from 40 to 400, especially from 50 to 200, $\mu$m. Individual holes are preferably arranged in the form of a ring on a rectangular plate. The pressure drop in the spinneret in the case of hole diameters of 100 $\mu$m, for example, is about 50 bar.

C. The individual filaments emerging from the spinneret are bathed for from 0.5 to 60 sec in dry air in a drying shaft. The air is passed cocurrently to the emerging filaments and it has a temperature within the range from 20 to 200° C., preferably from 50 to 150° C. This measure preferably removes from 10 to 90% of the water present in the filaments, so that their residual water content is less than 10, preferably less than 5, % by weight.

In a preferred embodiment of the present invention, from 0.1 to 3% by weight, based on the precondensate, of a curing catalyst are introduced into the drying shaft together with the air. Preferred curing catalysts include organic acids, for example formic acid, acetic acid, sulfamic acid and amino acids.

On emerging from the drying cell the filament bundle can be drawn off by means of godets, twisted by means of a twisting nozzle through sideways blowing with air, laid down as a continuous filament material, or cut directly to a certain staple length. This is the point at which, if desired, surface auxiliaries, for example antistick agents and silicone oils, can be added.

D. The dried filaments are then treated for from 10 to 200, preferably from 40 to 90, min in a tempering oven. It is essential that the temperature in this oven gradually increase. This can be achieved for example by successive temperature zones in the oven. In this way the oven can be kept comparatively short. If desired, a further catalyst can be added to the warm circulating air. The maximum temperature should be from 160 to 250° C., preferably from 200 to 230° C. The precondensate is fully cured, so that nontacky continuous filament fibers are obtained.

E. These continuous filament fibers are finally wound up or cut. The take-off speed can be varied within wide limits. It is customarily within the range from 200 to 250 m.min$^{-1}$.

The continuous filament fibers produced according to the present invention can be processed into incombustible and infusible wovens and nonwovens.

The drawing shows a preferred embodiment of the present invention, the reference numerals of which are explained in the Example which follows.

EXAMPLE

The resin is prepared without bubbles in a stirred tank (1). The water content at the start of the reaction is 18%. The viscosity of the resin to be spun is about 9000 Pas/25° C.

The resin is conveyed by a pump (2) and filtered with the aid of depth filters (3) made of metal and forced by means of a further pump (4) through the spinneret orifices (6). The spinneret has 900 holes 100 $\mu$m in diameter. The throughput of resin per hole is 6 g/h.

In the drying shaft (5) the fibers (8) are dried within 1.5 s by an air stream (7) with an air inlet temperature of 95° C. and an air outlet temperature of about 125° C. The take-off speed is 200 m/min.

The fibers are laid down as continuous filament material, tempered in a drying cabinet (9) in four temperature stages (100° C./130° C./160° C./220° C.) each 20 min in length, and finally wound up at (10).

The individual fiber has a diameter of 17 μm, a tenacity of 2.8 cN/dtex and a breaking extension of 32%.

We claim:

1. A process for producing continuous filament fiber from condensation products of
   (a) from 30 to 99 mol % of melamine and
   (b) from 1 to 70 mol % of a substituted melamine of the general formula I

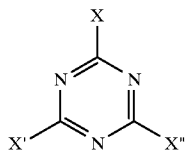

I where X, X' and X" are each selected from the group consisting of —$NH_2$, —NHR and —NRR', and X, X' and X" are not all —$NH_2$, and R and R' are each selected from the group consisting of hydroxy—$C_2$—$C_4$—alkyl, hydroxy—$C_2$—$C_4$alkyl—(oxa—$C_2$—$C_4$—alkyl)$_n$, where n is from 1 to 5, and amino—$C_2$—$C_{12}$—alkyl, or mixtures of melamines I, with formaldehyde or formaldehyde-supplying compounds in a molar ratio of melamines to formaldehyde within the range from 1:1 to 1:4.5 by spinning a highly concentrated aqueous solution of the melamine-formaldehyde-precondensate, evaporating the water and curing the precondensate, which comprises the following steps:

A. filtering an aqueous solution of the precondensate with a water content of from 5 to 40% by weight to remove coarse particles and impurities, B. forcing the bubble-free aqueous solution through a spinneret having from 500 to 5000 holes each from 40 to 400 μm in diameter, C. bathing the extruded filaments in a drying shaft with a cocurrent stream of dry hot air at from 20 to 200° C. for from 0.5 to 60 sec to reduce the residual water content to less than 10% by weight, D. converging the dried filaments into fiber bundles to treat them in a tempering oven for from 10 to 200 min at temperatures which gradually increase to a maximum temperature within the range from 160 to 250° C. and fully cure the precondensate, and E. winding up or cutting the fiber.

2. A process as claimed in claim 1, wherein the melamine-formaldehyde precondensate (c) contains from 0.1 to 10 mol %, based on a+b+c, of substituted or unsubstituted phenols as cocondensed units.

3. A process as claimed in claim 1, wherein, in stage C, from 0.1 to 3% by weight, based on the precondensate, of a curing catalyst is introduced into the drying shaft together with the air.

4. Incombustible and infusible wovens and nonwovens formed from the fibers and filaments produced by the process of claim 1.

* * * * *